Patented Oct. 14, 1952

2,614,089

UNITED STATES PATENT OFFICE 2,614,089

PREPARATION OF SYNTHETIC POLYMERIC MATERIALS

Stuart A. Harrison, Stow, Ohio, and Walter E. Brown, Cambridge, Mass., assignors to The B. F. Goodrich Company, New York, N. Y., a corporation of New York No Drawing. Application May 23, 1946, Serial No. 671,897

7 Claims. (Cl. 260—29.7)

This invention relates to synthetic polymeric materials and to a method of preparing the same, and is especially concerned with the preparation of polymeric materials in which a rubbery copolymer of a butadiene-1,3 hydrocarbon and another polymerizable compound is uniformly and intimately combined with a hard resinous saturated polymer of an organic compound containing an olefinic double bond connected to a methylene group.

Rubbery copolymers of a butadiene-1,3 hydrocarbon with a copolymerizable unsaturated compound, which is generally a polymerizable compound containing a single olefinic double bond, constitute a well known class of materials. Such materials (often called "butadiene synthetic rubbers") are characterized chemically by possessing long carbon chains containing a multiplicity of intra-chain carbon to carbon double bonds, that is, they are high molecular weight (a molecular weight generally above 50,000) linear polymers with a high degree of aliphatic unsaturation (iodine numbers generally above about 50); and are characterized physically by a resemblance to natural rubber in that they are capable of being converted from an essentially plastic workable condition to a highly elastic condition by vulcanization, as by heating with sulfur. At present the best known types of such materials are the rubbery copolymers of butadiene-1,3 and styrene, and the rubbery copolymers of butadiene-1,3 and acrylonitrile.

Although such butadiene synthetic rubbers resemble natural rubber in many respects and are even superior thereto in certain respects, they also possess an outstanding disadvantage as compared to natural rubber. This disadvantage resides in the fact that they are generally much weaker and much less elastic when vulcanized in a "pure gum" recipe (that is, a recipe which includes the rubbery material and vulcanizing ingredients but is free from significant amounts of other compounding ingredients such as pigments, fillers, softeners, etc.) than is natural rubber. For example, "pure gum" vulcanizates of natural rubber possess a tensile strength ranging from 2,000 to 3,000 lbs./sq. in. or more and are highly elastic, whereas "pure gum" vulcanizates of such synthetic rubbers possess tensile strengths generally less than 1,000 lbs./sq. in., and often as low as 200 to 500 lbs./sq. in., and are not nearly so elastic. As a result, such synthetic rubbers must be compounded with carbon black (which remarkably reinforces the synthetic rubber, to an extent even greater than it does with natural rubber) to attain sufficient strength to be useful, even though this is undesirable in many instances because of the black coloration and the increased stiffness of the composition.

Another class of polymeric materials, quite different in properties from the rubbery butadiene-1,3 copolymers, are the hard, solid, resinous, saturated polymers of unsaturated compounds containing an olefinic double bond connected to a methylene ($CH_2$) group. These materials are also high molecular weight polymers (molecular weight generally above 50,000) containing long carbon chains, but they differ from the rubbery copolymers in that these chains are substantially saturated (the double bonds of the monomer disappearing on polymerization), and as a result the polymer possesses an iodine number of zero or thereabouts. In physical properties these materials also differ from rubbery materials since they are hard and stiff at ordinary temperatures (having a Brinell hardness number in the unplasticized condition within the range of about 10 to 50 as measured on the Brinell apparatus using a 2.5 m. m. ball with a 25 k. g. load); they are not appreciably elastic unless mixed with plasticizers; and they are not vulcanizable in the manner of natural rubber. Moreover, they are thermoplastic whereas the rubbery copolymers stiffen at elevated temperatures. Typical members of this class of materials are the various vinyl resins, styrene resins and acrylic resins.

It has heretofore been proposed to form blends of certain of the rubbery copolymers of the first of the above-described classes with certain of the hard saturated resins of the second of the above-described classes by mixing the materials on a mill or in an internal mixer, but, with a few notable exceptions, this practice has met with little success. Thus, in many instances the materials are not compatible with or soluble in one another, and as a result the blend obtained is weaker and less desirable than either of the materials alone. In a few instances, however, such as when a butadiene-1,3 acrylonitrile copolymer synthetic rubber is mixed with a vinyl resin such as polyvinyl chloride, the materials are mutually soluble in one another and homogenous blends possessing properties more desirable for many purposes than either of the constituents are obtained.

One of the principal objects of this invention is to provide a method whereby rubbery butadiene-1,3 hydrocarbon copolymers and hard saturated resinous polymers may be intimately combined with one another, regardless of whether the materials are soluble or insoluble in one another, to produce polymeric materials having properties more valuable than either of the materials alone.

A second principal object is to provide a new class of synthetic polymeric materials, which are rubbery and vulcanizable in nature, and which resemble natural rubber, rather than butadiene synthetic rubber, in that they may be vulcanized in a "pure gum" recipe to produce strong snappy vulcanizates having a tensile strength above 1,000 lbs./sq. in., yet are far superior to natural rubber in resistance to oxidation, to chemicals and to other deteriorating influences.

Numerous other objects will be apparent hereinafter.

The first of the principal objects is attained by the method of this invention, which method comprises the steps of emulsifying a monomeric mixture polymerizable in aqueous emulsion to form an unsaturated rubbery copolymer, and comprising a butadiene-1,3 hydrocarbon and a copolymerizable compound, in an aqueous emulsifying medium containing dispersed solid particles of a hard saturated resinous polymer of an organic compound containing a single olefinic double bond connected to a methylene group, and then polymerizing the said monomeric material while so emulsified. A most convenient way of proceeding is to polymerize the mixture of butadiene-1,3 hydrocarbon and copolymerizable compound in aqueous emulsion in the usual manner except that the polymerization is carried out in the presence of a previously prepared aqueuos dispersion or latex of the saturated resin. When practicing this method (sometimes referred to hereinafter for sake of brevity as "seeding" the emulsion copolymerization forming a butadiene copolymer with hard saturated resinous polymer), it has been found that formation of rubbery copolymer occurs on the surfaces of the particles of saturated resinous polymer to produce an aqueous dispersion in which the rubbery copolymer and the saturated resin are present in the same individual particles. As a result, coagulation of the dispersion produces a polymeric material in which the rubbery copolymer and the saturated resin are uniformly and intimately combined, regardless of whether they are soluble in one another.

When the hard saturated resin employed in the method described is insoluble in the rubbery copolymer formed by the polymerization, and is present in a proportion less than that of the rubbery copolymer, the second of the above-stated objects is attained. For in this instance it has been found that the aqueous dispersion obtained by the polymerization consists of particles containing a core of the hard saturated resin surrounded by a covering of vulcanizable rubbery copolymer, and that coagulation of this dispersion yields a rubbery vulcanizable polymeric material comprising small discrete particles of hard saturated resin evenly and intimately dispersed or embedded in a continuous phase of the rubbery copolymer. Such copolymeric materials closely resemble natural rubber in that they are strong and elastic, yet soft and flexible, when vulcanized in a "pure gum" recipe. They are quite useful in the production of many articles customarily made from "pure gum" rubber compounds such as nursing nipples, rubber thread, stationers' bands, surgical goods, etc., which are superior to those made from butadiene synthetic rubber because of a much greater strength and elasticity and are superior to those made from natural rubber because of a greater resistance to various deteriorating influences. Additionally, these polymeric materials may be compounded with fillers, pigments, etc. and vulcanized to produce improved compositions useful for the same multifarious purposes as are other rubbery materials, such compounded materials being particularly useful for applications where it is undesirable to use carbon black as in producing white and brightly colored compositions and in electrical insulation.

The practice of the invention in preferred embodiments utilizing a hard saturated resin insoluble in the rubbery copolymer formed by the polymerization may be illustrated by the following specific examples in which all parts are by weight.

EXAMPLES 1 TO 4

*Seeding emulsion copolymerization of butadiene-1,3 and styrene with latex of polyvinyl chloride*

In these examples a mixture of butadiene-1,3 and styrene (which is polymerizable to form a rubbery copolymer) is emulsified in an aqueous emulsifying medium containing varying amounts of dispersed, finely-divided particles of polyvinyl chloride (which is a hard, saturated resinous polymer insoluble in the rubbery butadiene-1,3 styrene copolymer) and is then polymerized while so emulsified. The precise procedure utilized is as follows:

A polyvinyl chloride latex containing about 19.5% by weight of dispersed polyvinyl chloride in the form of particles of an average diameter of about 0.03 micron is prepared by polymerizing 100 parts of vinyl chloride in an aqueous emulsion containing 150 parts of water, 4 parts of fatty acid soap as emulsifying agent, 0.45 part of potassium persulfate as polymerization catalyst, and 0.3 part of 28% ammonium hydroxide as a buffer, at a temperature of 50° C. for about 20 hrs. (about 95% of the vinyl chloride then being converted to polymer), and then diluting the resulting latex to a total solids concentration of about 20%. Varying amounts of this polyvinyl chloride latex are then mixed with 90 parts of monomeric butadiene-1,3, 30 parts of monomeric styrene, 2.4 parts of fatty acid soap, 0.36 part of potassium persulfate, 0.54 part of n-dodecyl mercaptan as a polymerization modifier, and sufficient water to make a total of about 300 parts, to form emulsions of the monomeric material, which is then polymerized by agitating the emulsions at 50° C. for about 20 hours, after which time about 80% of the monomers are polymerized. The products consist of aqueous dispersions containing finely-divided particles of polymeric material, which on examination with the electron microscope are found to consist of a core of polyvinyl chloride surrounded by a covering of rubbery butadiene-1,3 styrene copolymer. The dispersions are then coagulated by addition of acid and the polymeric materials washed and dried.

The polymeric materials are then compounded in a "pure gum" recipe with 10 parts of litharge, 5 parts of zinc oxide, 5 parts of coal tar and 2 parts of sulfur for each 100 parts of butadiene styrene copolymer present and are then vulcanized by heating at 307° F. for 45 minutes.

The following table shows the parts of polyvinyl chloride present for each 100 parts of rubbery butadiene-1,3 styrene copolymer in the polymeric materials, and the tensile strength, ultimate elongation and modulus of elasticity at 300% elongation of the vulcanizates. Data on a butadiene-1,3 styrene copolymer prepared in the same way except that no polyvinyl chloride latex was used is also included for comparison.

|  | Parts Polyvinyl Chloride per 100 parts Butadiene-1,3 Styrene Copolymer | Tensile Strength, lbs./sq. in. | Ultimate Elongation (percent) | Modulus at 300%, lbs./sq. in. |
| --- | --- | --- | --- | --- |
| Control | 0 | 250 | 300 | 250 |
| Example 1 | 9.5 | 875 | 510 | 115 |
| Example 2 | 18.2 | 1,200 | 840 | 275 |
| Example 3 | 27.3 | 1,150 | 740 | 360 |
| Example 4 | 36.4 | 1,200 | 690 | 610 |

It is apparent that the polymeric materials containing polyvinyl chloride are far superior to the control in tensile strength and elasticity and that these improvements are secured without appreciable stiffening of the vulcanizate. These "pure gum" vulcanizates are thus more like natural rubber "pure gum" vulcanizates in physical properties. These improvements are not secured however when it is attempted to mix polyvinyl chloride and the butadiene-1,3 styrene copolymer on a mixing mill or by other conventional methods.

EXAMPLES 5 AND 6

*Seeding emulsion copolymerization of butadiene-1,3 and styrene with latex of polyvinylidene chloride*

The procedure of the preceding examples is repeated except that various proportions of a polyvinylidene chloride latex containing about 15% by weight of polyvinylidene chloride in the form of small particles of about 0.04 micron in average diameter, and prepared by the polymerization at 50° C. of 75 parts of vinylidene chloride in an aqueous emulsion containing 367 parts of a 2% aqueous soap solution and 0.45 part of potassium persulfate, are used in place of the polyvinyl chloride latex. The amount of polyvinylidene chloride present for each 100 parts of the butadiene styrene copolymer formed by the polymerization, and the physical properties of the polymeric materials obtained when vulcanized in the "pure gum" recipe set forth in the preceding examples, are as follows:

|  | Parts Polyvinyl Chloride per 100 parts Butadiene-1,3 Styrene Copolymer | Tensile Strength, lbs./sq. in. | Ultimate Elongation (percent) | Modulus at 300%, lbs./sq. in. |
| --- | --- | --- | --- | --- |
| Control |  | 250 | 300 | 250 |
| Example 5 | 37.6 | 1,100 | 840 | 275 |
| Example 6 | 51.4 | 1,200 | 640 | 350 |

It is again apparent that the presence of hard saturated resin (polyvinylidene chloride in this instance) increases the tensile strength and elasticity of the "pure gum" vulcanizate without greatly affecting the modulus. As in the case of polyvinyl chloride, this improvement is not secured when it is attempted to mill mix the polyvinylidene chloride and the rubbery copolymer, which are not compatible with one another.

Substantially equivalent results are secured when using in place of polyvinyl chloride or polyvinylidene chloride, other hard saturated resins prepared by the polymerization of a monomeric mixture consisting predominantly of vinyl chloride or vinylidene chloride such as the copolymers of vinyl chloride and vinylidene chloride and the copolymers of either of these with other monomers containing a single olefinic double bond such as ethyl acrylate, butyl acrylate, methyl methacrylate, acrylonitrile, diethyl maleate and the like.

EXAMPLES 7 AND 8

*Seeding emulsion copolymerization of butadiene-1,3 and styrene with latex of styrene resin*

In these examples a mixture of 75 parts of butadiene-1,3 and 25 parts of styrene is emulsified with 75 parts of a 5% aqueous soap solution, 0.3 part of potassium persulfate, 0.5 part of n-dodecyl mercaptan and with a latex of saturated styrene resin containing 24.8 parts of dispersed resin and sufficient soap solution to make a total of 180 parts of water. The styrene resin latex used in Example 7 is a latex containing dispersed finely-divided particles of tough, solid polystyrene (average diameter about 0.08 micron), prepared by polymerizing monomeric styrene in aqueous emulsion in the presence of soap and potassium persulfate. The latex used in Example 8 is similar but contains a harder benzene-insoluble polystyrene, and is prepared by the polymerization in the same manner of a monomeric mixture consisting of 95% monomeric styrene and 5% divinyl benzene. The emulsions containing the monomeric butadiene-1,3 and styrene and the styrene polymer particles are then agitated at 50° C. for about 15 hours, whereupon about 80% of the butadiene-1,3 and styrene is polymerized upon the particles of styrene polymer. The resulting dispersions are coagulated to yield polymeric materials comprising 31 parts of resinous styrene polymer for each 100 parts of rubbery butadiene-1,3 styrene copolymer. The polymeric materials are then compounded in the "pure gum" recipe of the preceding examples and vulcanized for 45 minutes at 307° F. The physical properties of the vulcanized polymeric materials of the two examples are as follows:

|  | Resin Present | Tensile Strength, lbs./sq. in. | Ultimate Elongation, (percent) | Modulus at 300%, lbs./sq. in. |
|---|---|---|---|---|
| Example 7 | 100% Polystyrene | 1,600 | 620 | 400 |
| Example 8 | 95% Polystyrene with 5% Copolymerized Divinyl Benzene. | 2,600 | 650 | 250 |

It is seen that both of the resinous styrene polymers increase the tensile strength and elasticity of the rubbery copolymer, and that the effect of the benzene insoluble resin (containing copolymerized divinyl benzene) is much more pronounced than that of 100% polystyrene. Although the 100% polystyrene is soluble in benzene, as is the rubbery copolymer of butadiene-1,3 and styrene, the two materials are not soluble in one another, and hence the polymeric material obtained when using 100% polystyrene differs widely from a mill-mixed blend of polystyrene and the rubbery butadiene-1,3 styrene copolymer. Such a blend, for example, using the same materials in the same proportions as in Example 6, when vulcanized in the same "pure gum" recipe possesses a tensile strength of only about 500 lbs./sq. in. The benzene insoluble styrene resin (containing copolymerized divinyl benzene) is insoluble in the rubbery butadiene-1,3 styrene copolymer and cannot be blended therewith on a mixing mill.

EXAMPLES 9 TO 15

*Seeding emulsion copolymerization of butadiene-1,3 and acrylonitrile with latex of styrene resin*

In these examples rubbery polymeric materials are prepared by the polymerization at 30° C. of a monomer mixture of butadiene-1,3 and acrylonitrile containing 55% by weight of butadiene-1,3 in an aqueous emulsion containing for each 100 parts of monomers, about 5 parts of a fatty acid soap as emulsifying agent, about 0.3 part of hydrogen peroxide as polymerization initiator, about 0.6 part of diisopropyl dixanthogen as polymerization modifier, and about 0.2 part of a polymerization catalyst comprising complex pyrophosphates of iron and cobalt, in the presence of various previously prepared aqueous dispersions of hard saturated styrene resins in varying proportions. The aqueous dispersions of styrene resins utilized are as follows:

A. 100% polystyrene latex identical with that disclosed in Example 7 hereinabove.

B. Latex of 95% polystyrene containing 5% copolymerized divinyl benzene identical with that disclosed in Example 8 hereinabove.

C. A latex containing about 30% by weight of small particles (about 0.03 micron in average diameter) of a hard resinous polystyrene, the latex being prepared by emulsifying 100 parts of styrene, 0.35 part of triisobutyl mercaptan as a polymerization modifier, and 0.2 part of p-methoxy-phenyl-diazo-thio-beta-naphthyl ether as a polymerization promoter in 300 parts of water containing 5 parts of fatty acid soap as emulsifying agent and 0.3 part of potassium ferricyanide as a polymerization catalyst and then polymerizing the emulsified styrene at 50° C. for 8 hours, whereupon substantially all of the monomer is converted into hard resinous polystyrene.

D. A latex containing about 30% by weight of small particles of hard resinous copolymer of styrene and acrylonitrile prepared as in C above except that a mixture of 80 parts of styrene and 20 parts of acrylonitrile is employed in place of 100 parts of styrene.

In each instance an aqueous dispersion is obtained by the polymerization, which is then coagulated by the addition of alcohol and salt to yield a polymeric material comprising a continuous phase of a rubbery butadiene-1,3 acrylonitrile copolymer in which small discrete particles of hard resinous polymer are uniformly dispersed. The polymeric materials are then compounded in the "pure gum" recipe of the preceding examples and vulcanized at 307° F. The particular styrene resin latex used, the proportion of styrene resin to that of rubbery copolymer, and the tensile strength, elongation and 300% modulus of the vulcanizates, for each of the examples, together with that of a control containing no resinous polymer are shown in the following tabulation:

| Example No. | Styrene Resin Latex Utilized | Parts Styrene Resin to 100 parts of Rubbery Copolymer | Vulcanizate | | |
|---|---|---|---|---|---|
| | | | Tensile Strength, lbs./sq. in. | Elongation (percent) | 300% Modulus, lbs./sq. in. |
| 9 | A | 11 | 2,400 | 925 | 200 |
| 10 | A | 22 | 2,250 | 625 | 550 |
| 11 | A | 76 | 2,025 | 405 | 1,575 |
| 12 | B | 12.6 | 3,300 | 640 | 400 |
| 13 | B | 27 | 2,950 | 650 | 550 |
| 14 | C | 25.8 | 2,175 | 660 | 600 |
| 15 | D | 27.6 | 2,475 | 580 | 975 |
| Control | None | | 625 | 530 | 200 |

The results of these examples show that each of the styrene resins greatly improves the properties of the rubbery butadiene-1,3 acrylonitrile copolymers. Since the styrene resins are all insoluble in this rubbery copolymer, this improvement cannot be effected by mixing the resin with the rubbery copolymer on a mixing mill.

Results substantially equivalent to those set forth in Examples 7 to 15 are secured by substituting for the specific styrene resin latices used, other latices of hard saturated resinous polymers prepared by the polymerization in aqueous emulsion of styrene or other alkenyl substituted aromatic compounds of the formula

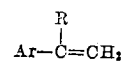

wherein Ar is an aromatic radical having its connecting valence on a ring carbon atom and R is hydrogen or alkyl, such as alpha-methyl styrene, p-methyl styrene, dichloro styrene, p-cyano styrene, p-methoxy styrene, vinyl naphthalene or the like, either alone or in admixture with each other or with lesser amounts of other compounds copolymerizable therewith to yield hard saturated resins including monomers containing a single olefinic double bond such as vinyl chloride, vinylidene chloride, methyl acrylate, methyl methacrylate, acrylonitrile and the like and also monomers containing two or more double bonds which are not conjugated such as divinyl benzene, dimethallyl, diallyl maleate, diallyl phthalate, allyl cinnamate, trimethallyl phosphate, the dicinnamate of 1,4-dioxanediol-2,3, 2-chloroallyl crotonate, allyl methacrylate, diallyl ketone and the like.

The specific examples hereinabove cited illustrate the method of the invention and the polymeric materials obtained when a mixture, of a butadiene-1,3 hydrocarbon and a copolymerizable compound, which mixture is capable of polymerizing to a rubbery copolymer, is emulsified and polymerized in an aqueous medium in the presence of dispersions of various hard saturated resins insoluble in the rubber copolymer. Many variations in the details of the specific examples, however, may be effected without departing from the scope of the invention, as will be apparent to those skilled in the art. Thus, variations may be effected in the nature and proportions of materials used and in the conditions and procedures employed while still obtaining the advantageous results described. The most important of these variations will be discussed hereinbelow. Others will be apparent without discussion to those skilled in the art.

In the examples the monomeric mixture of butadiene-1,3 hydrocarbon and copolymerizable compound which is polymerized to form a rubbery copolymer, by the method of this invention has been a mixture of butadiene-1,3 and styrene or a mixture of butadiene-1,3 and acrylonitrile. Various other mixtures are substantially equivalent in this respect to the specific mixtures used and may be substituted therefor. In general, any mixture containing a butadiene-1,3 hydrocarbon and a copolymerizable compound containing a single olefinic double bond in proportions such that an unsaturated rubbery copolymer is formed on polymerization of the mixture in aqueous emulsion may be utilized. For example, there may be used mixtures containing a predominant amount of butadiene-1,3, isoprene, 2,3-dimethyl butadiene-1,3 or piperylene or a combination of two or more of these and a lesser amount of one or more of the following monomers: styrene, alpha-methyl styrene, p-methoxy styrene, p-chloro styrene, dichloro styrene, vinyl naphthalene and other alkenyl substituted aromatic compounds of the formula

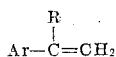

wherein Ar is an aromatic radical having its connecting valence on a ring carbon atom and R is hydrogen or alkyl; acrylonitrile, methacrylonitrile, ethacrylonitrile, alphachloro acrylonitrile, methyl methacrylate, ethyl methacrylate, isobutyl methacrylate, methyl acrylate, propyl acrylate, butyl acrylate, octyl acrylate, methyl alpha-chloro acrylate, methacrylamide, acrylamide, N,N-diethyl acrylamide and other nitriles, amides and alkyl esters of alpha-methylene aliphatic monocarboxylic acids; diethyl fumarate, diethylchloromaleate, vinylidene chloride, methyl vinyl ketone, methyl isopropenyl ketone, vinyl pyridines, vinyl furan, vinyl carbazole, isobutylene, ethylene and the like. Unsaturated rubbery copolymers are also obtained on polymerization of certain monomer mixtures containing a lesser amount of the butadiene-1,3 hydrocarbon than of the copolymerizable monoolefinic compound, and such mixtures may also be used when this is the case. It is generally desirable however that the monomer mixture contain at least about 30% and preferably from 50 to 90% by weight of butadiene-1,3 hydrocarbon, preferably butadiene-1,3, and the remainder of copolymerizable monomeric material containing a single olefinic double bond, preferably styrene or acrylonitrile.

Numerous specific hard saturated resinous polymers which may be present in the dispersed condition in the aqueous medium in which the monomer mixture containing the butadiene-1,3 hydrocarbon is polymerized, according to the method of invention, have been mentioned in the specific examples. These include saturated resinous polymers of monomeric materials in which the predominant constituent is vinyl chloride or vinylidene chloride, and saturated resinous polymers of monomeric materials in which the predominant constituent is styrene or other alkenyl substituted aromatic compound. Still other hard saturated resinous polymers may also be utilized. For example, saturated polymers of monomeric materials in which the predominant constituent is a nitrile of an alpha-methylene aliphatic monocarboxylic acid such as acrylonitrile, methacrylonitrile, ethacrylonitrile, alpha-chloro acrylonitrile and the like are quite suitable, their use being more specifically disclosed and illustrated in our copending application Serial No. 671,898, filed May 23, 1946, now Patent No. 2,538,779, especially in Examples 1, and 3 to 8 thereof, the disclosure of which is incorporated herein by reference. Saturated polymers of monomeric materials in which the predominant constituent is an alkyl ester or amide of an alpha-methylene monocarboxylic acid such as the alkyl methacrylates, alkyl alpha-chloro acrylates, acrylamides, methacrylamides, etc., are also hard and resinous and may be used in this invention, as any hard saturated polymers or other monomeric materials in which the predominant constituent is some other vinyl or vinylidene compound such as methyl vinyl ketone, methyl isopropenyl ketone, vinyl acetate, vinyl carbazole, vinyl pyridine or the like. In short, any hard saturated resin consisting of a polymer (which term includes copolymers) of an organic compound containing a single olefinic double bond connected to a methylene group (i. e., possessing the structure $CH_2=C<$) present in the dispersed condition in the aqueous medium in which the monomer mixture containing a butadiene-1,3 hydrocarbon is emulsified and polymerized, according to this invention. It is preferred that the saturated resin be prepared by polymerization in aqueous emulsion and that the dispersion or latex obtained be utilized to supply the resin, and it is also preferred that the particles of resin in the latex be no greater than about 0.4 micron in average diameter, and more preferably less than about 0.1 micron in average diameter, but other procedures for supplying the resin in dispersed form are also included. It is also preferred that the resin possess a Brinell hardness number within the range of about 10 to 50 when measured on the Brinell apparatus using a 2.5 m. m. ball with a 25 k. g. load, as do the resins used in the specific examples.

As mentioned hereinabove the method of this invention embraces the polymerization in aqueous emulsion of any of the various monomer mixtures described in the presence of a dispersion of any of the various hard saturated resins described, since in all instances advantages are thereby secured. Even when the resin utilized is mutually soluble in the rubbery copolymer obtained by the polymerization, as is the case when the monomer mixture consists of butadiene-1,3 and acrylonitrile and the resin is polyvinyl chloride, the method offers advantages in that it provides a more convenient means of obtaining a blend of these materials since the expenditure of time and energy in blending the separately prepared materials is eliminated. The method also embraces the use of any desired proportions of resin to rubbery copolymer formed by the polymerization since an intimate admixture of the resin and the rubbery copolymer is obtained regardless of proportions.

The invention, however, is confined to polymeric products in which a major proportion of rubbery copolymer is combined with a minor proportion of hard saturated resin in such a manner that small discrete particles of the resin are surrounded by a body of the rubbery copolymer, since it is only such polymeric products that possess the advantage of being vulcanized in a "pure gum" receipe to produce strong snappy vulcanizates greatly superior to those of butadiene synthetic rubbers in tensile strength and elasticity. To produce such products it is necessary that the hard saturated resin employed be substantially insoluble in the rubbery copolymer obtained by polymerization of the monomer mixture containing butadiene-1,3 hydrocarbon, and that the amount of resin used be no greater, preferably less, than that of the rubbery copolymer formed by the polymerization. It is of course an easy matter to determine whether or not any given resin is insoluble in any given rubbery copolymer as by combining the two materials on a mixing mill at a temperature above the softening point of the resin if the resin is thermoplastic and determining if a homogeneous composition, which indicates solubility, is obtained or by mixing solutions of the resin and the synthetic rubber in the same or miscible solvents and determining if a homogeneous composition is obtained on removal of the solvent.

The precise proportion of hard saturated resin employed in producing the polymeric products of the invention may be varied throughout the range of 1 to 100 parts of resin for each 100 parts of rubbery copolymer produced in the polymerization, and in each instance a rubbery vulcanizable polymeric material of considerably higher tensile strength than the rubbery copolymer alone is obtained. However, polymeric materials most useful for most purposes are secured when the proportion of hard saturated resin is from about 5 to 80 parts, more preferably from about 15 to 60 parts, to each 100 parts of rubbery copolymer, since such polymeric materials when vulcanized give strong snappy "pure gum" vulcanizates resembling those obtainable from natural rubber. When the proportion of resin is increased to about 80 to 100 parts for each 100 parts of rubbery copolymer, the polymeric materials are still capable of vulcanization but are somewhat stiffer and more like leather when vulcanized.

In addition to the above-discussed modifications and variations in the nature and proportions of essential materials used in practicing the invention, other modifications and variations from the specific examples are also possible. Thus, in polymerizing the monomer mixture containing butadiene-1,3 hydrocarbon in aqueous emulsion in the presence of a dispersion of the resin, use may be made of any of the various emulsifying agents, polymerization catalysts, polymerization modifiers, etc. commonly employed in the polymerization of butadiene-1,3 hydrocarbon containing mixtures in aqueous emulsion. The conditions of polymerization such as time and temperature and degree of agitation may also be varied in accordance with established procedures. Similar variations may be made in the polymerization to form the hard saturated resin if it is formed by previous polymerization in aqueous emulsion.

The products of the polymerizations described are first obtained in the form of an aqueous dispersion or latex. These latices may be used as such or they may be coagulated by any of the methods well known to the art, to yield the polymeric product in solid form. At this stage, the polymeric products of this invention comprise a continuous phase of rubbery copolymer in which there is dispersed small discrete particles of hard saturated resin. Compounding ingredients such as softeners, plasticizers, pigments, fillers, colors, stabilizing agents, antioxidants, vulcanizing ingredients, etc. may be added to the dispersion before coagulation or to the solid polymeric products after coagulation in the manner well known to the art, if desired, it being understood that the presence or absence of such materials will depend primarily upon the use to be made of the finished product and is in no way critical in this invention.

It will be apparent from the above description that the invention is not limited to the specific embodiments set forth, but only as required by the spirit and scope of the appended claims.

We claim:

1. The method of producing rubbery vulcanizable polymeric materials which comprises polymerizing a monomer mixture polymerizable to form an unsaturated rubbery copolymer and containing from about 50 to 90% by weight of butadiene-1,3 and the remainder of acrylonitrile, in an aqueous emulsion in the presence of a previously prepared aqueous dispersion comprising particles below 0.4 micron in average diameter of a hard saturated resinous polymer of a monomeric material consisting predominantly of styrene, the said saturated resinous polymer being present in an amount from 5 to 100% by weight of that of the rubbery copolymer formed by the polymerization, and then coagulating the aqueous dispersion thereby obtained.

2. The method of producing rubbery vulcanizable polymeric materials which comprises polymerizing a monomer mixture polymerizable to form an unsaturated rubbery copolymer and containing from about 50 to 90% by weight of butadiene-1,3 and the remainder of acrylonitrile, in an aqueous emulsion in the presence of a previously prepared aqueous dispersion comprising particles below 0.4 micron in average diameter of hard, saturated polystyrene resin, the proportion of the said saturated resin being from about 15 to 60% by weight of the rubbery copolymer formed by the polymerization, and then coagulating the aqueous dispersion thereby obtained.

3. The method which comprises emulsifying a monomer mixture polymerizable to form an unsaturated rubbery copolymer and containing 50 to 90% by weight of butadiene-1,3 and the remainder of acrylonitrile, in an aqueous emulsion in the presence of a previously prepared aqueous dispersion comprising dispersed solid particles below 0.4 micron in average diameter of a hard saturated resinous polymer of an organic compound containing a single carbon to carbon unsaturated linkage which is an olefinic double bond and is connected to a methylene group, and then polymerizing the said monomeric mixture while so emulsified whereby formation of rubbery copolymer occurs on the dispersed resinous polymer particles to produce an aqueous dispersion in which the saturated resinous polymer and the rubbery copolymer formed by the polymerization are intimately combined in the same individual dispersed polymer particles, the amount of said resinous polymer present being from 5 to 100% by weight of that of the said rubbery copolymer.

4. An aqueous dispersion of polymeric material comprising, in the same individual dispersed polymer particles, a hard saturated resinous polymer of an organic compound containing a single carbon to carbon unsaturated linkage which is an olefinic double bond and is connected to a methylene group, intimately combined with a rubbery copolymer of 50 to 90% by weight of butadiene-1,3 and the remainder of acrylonitrile, the amount of said resinous polymer present in said dispersion being from 5 to 100% of that of the said rubbery copolymer, said dispersion being prepared by the method of claim 3.

5. The method which comprises preparing an aqueous dispersion comprising dispersed solid particles below 0.4 micron in average diameter of a saturated resinous polymer of monomeric material containing a single carbon-to-carbon unsaturated linkage which is an olefinic double bond and is connected to a methylene group, adding to said dispersion a monomeric mixture polymerizable to form a rubbery copolymer and containing from 50 to 90% by weight of butadiene-1,3 and the remainder of acrylonitrile, and polymerizing the said monomeric mixture in the presence of the said particles of saturated resinous polymer whereby formation of rubbery copolyous dispersion in which the saturated resinous mer occurs on said particles to produce an aquepolymer and the rubbery copolymer formed by the polymerization are intimately combined in the same individual particles, the said monomeric mixture being added and polymerized in a proportion sufficient to form, together with the said resinous polymer, a mixed polymeric product which when separated from the dispersion is a soft rubbery material vulcanizable with sulfur to a tensile strength above 1,000 lbs./sq. in.

6. The method of producing rubbery vulcanizable polymeric materials which comprises polymerizing a monomeric mixure polymerizable to form a rubbery copolymer and containing 50 to 90% by weight of butadiene-1,3 and the remainder of acrylonitrile in aqueous emulsion in the presence of a previously prepared aqueous dispersion comprising particles less than .4 micron in diameter of a hard resinous saturated polymer of a monomeric material composed predominantly of acrylonitrile, the said saturated polymer being present in a lesser amount by weight than the rubbery copolymer formed by the polymerization, and then coagulating the aqueous dispersion thereby obtained.

7. The method of producing a polymeric material vulcanizable to a tensile strength above 1,000 lbs./sq. in. without being compounded with carbon black which comprises polymerizing a monomeric mixture polymerizable to form a rubbery copolymer and containing from 50 to 90% by weight of butadiene-1,3 and the remainder of acrylonitrile, in an aqueous emulsion in the presence of a previously prepared aqueous dispersion comprising particles less than .4 micron in diameter of hard resinous polyacryonitrile, the proportion of polyacrylonitrile present being from about 15 to 60% by weight of the rubbery copolymer formed by the polymerization, and then cogulating the aqueous dispersion thereby obtained.

STUART A. HARRISON.
WALTER E. BROWN.

REFERENCES CITED

The following references are of record in the file of this patent:

UNITED STATES PATENTS

| Number | Name | Date |
|---|---|---|
| 2,211,429 | Mueller-Cunradi | Aug. 13, 1940 |
| 2,353,877 | Chollar | July 18, 1944 |
| 2,388,685 | Guss | Nov. 13, 1945 |
| 2,400,164 | Peaker | May 14, 1946 |
| 2,460,300 | Le Fevre et al. | Feb. 1, 1949 |

OTHER REFERENCES

Winkelmann: India Rubber World, March 1946, pages 799–801.

Marmix, 13 page publication of Marbon Corp., Gary, Ind., received by Patent Office April 8, 1946.

Kolthoff et al.: Rubber Chemistry and Technology, April 197, pp. 546–550. (Reprint of an October 1946 article.)

Official Digest, November 1944, pp. 501–510.

Bacon et al.: Proceedings of Rubber Tech. Conference, London, 1938.